Aug. 8, 1967  H. R. NORDIN ET AL  3,334,570
MEAT CURING APPARATUS
Filed Sept. 1, 1964  4 Sheets-Sheet 2

INVENTORS
Henry R. Nordin
Alton G. Steepe
BY Bacon & Thomas
ATTORNEYS

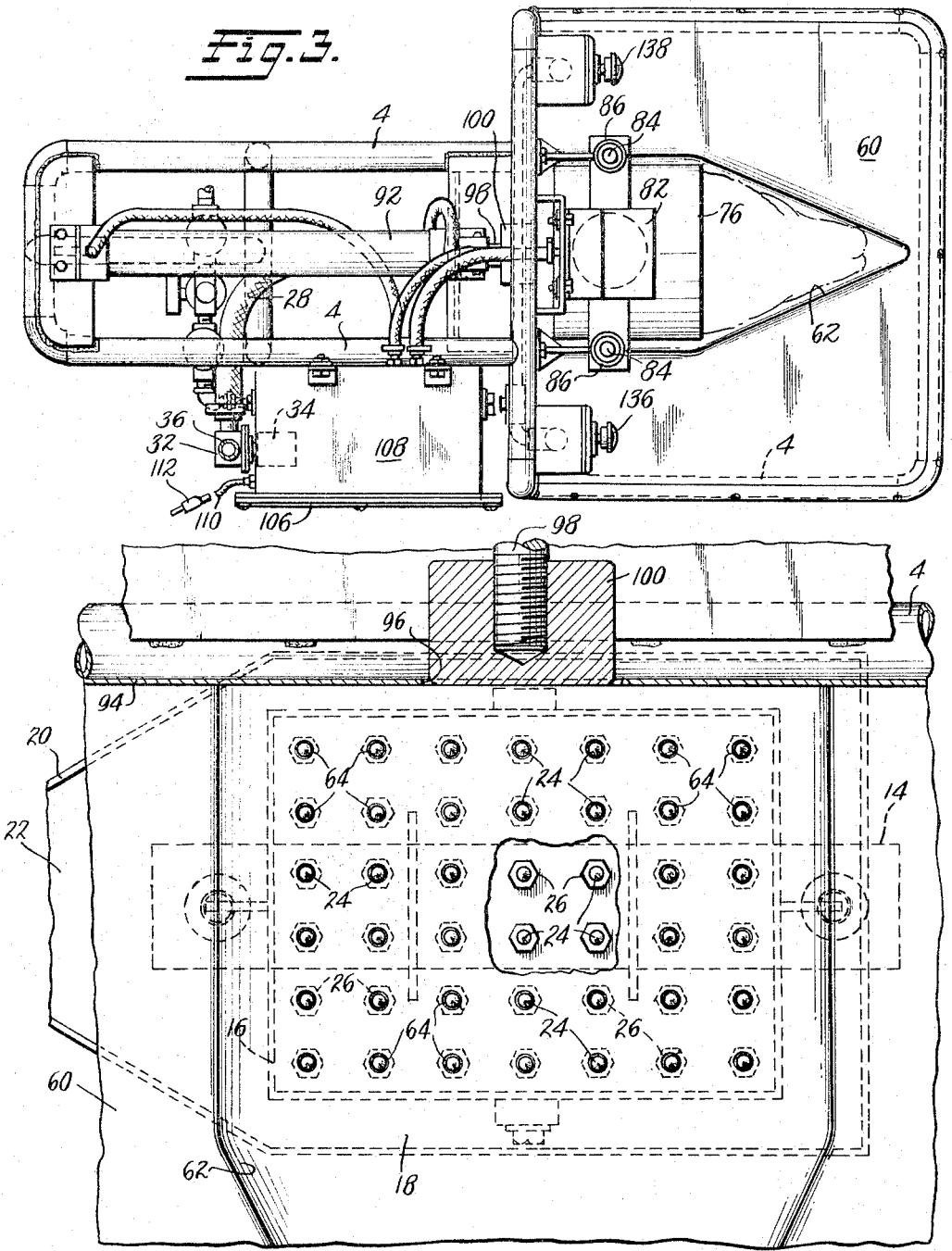

INVENTORS
Henry R. Nordin
Alton G. Steepe
BY Bacon & Thomas
ATTORNEYS

United States Patent Office 3,334,570
Patented Aug. 8, 1967

3,334,570
MEAT CURING APPARATUS
Henry R. Nordin, Maple, Ontario, and Alton G. Steepe, Toronto, Ontario, Canada, assignors to Canada Packers Limited, Toronto, Ontario, Canada
Filed Sept. 1, 1964, Ser. No. 393,682
10 Claims. (Cl. 99—257)

This invention relates to an apparatus for injecting curing pickle solution or the like into cuts of meat such as hams.

The development of cured meat color involves dispersion of pickle throughout the meat and subsequent color development by heating. For comminuted products there is no dispersal problem since the curing ingredients can be mixed intimately with the meat while chopping. When a product is to be preserved in its original form, however, a certain amount of curing time is required for the pickle to diffuse into the meat. One method commonly used for hastening pickle diffusion in meat cuts, in which the arterial system has not been damaged, is the pumping of the pickle through the artery system. For hams this does provide rapid, but unfortunately not uniform, dispersion and additional "stitch" strokes are necessary in the deficient areas. These strokes generally consist of an estimated amount of pickle injected manually through a perforated needle. The manual nature of this operation makes it inaccurate with respect to both the amount of pickle injected and the location of the injection sites.

The present invention deals with an apparatus designed to overcome the aforementioned problems and consists generally of a concave supporting seat for the cut of meat, the seat being preforated for the passage of injection needles. The needles pass upwardly through the seat and are arranged with their pointed ends defining a curved surface of such a contour as to penetrate all fleshly portions of a cut, such as ham, without striking the bone. To accomplish this, the needles are arranged to penetrate different portions of the meat to different depths. A clamping means is arranged to hold the meat down on its seat while the needles are perforating the meat, which clamp is then released before the pickle solution is pumped through the needles. In this way no external pressure is applied during the injection and diffusion of the solution through the meat is facilitated.

While the following description will be directed particularly to an apparatus and method designed for injecting a pickle solution into hams, it is to be understood that the invention is not limited thereto, that the principles may be employed for injecting other fluids, such as tenderizers, into cuts of meat other than hams.

It is, therefore, an object of this invention to provide an improved apparatus for injection of fluids into cuts of meat.

Another object of the invention is to provide an apparatus in which a cut of meat is clamped against a seat while needles are inserted therein and the clamping pressure then released during the injection cycle.

Still another object is to provide an apparatus as set forth wherein a means supporting the meat while it is being pierced also serves as a stripper for holding the meat when the needles are withdrawn.

A further object is to provide an apparatus as set forth above wherein different needles of the plurality of injection needles are arranged to penetrate the meat to different depth so as to avoid striking bone.

A further object of the invention is to provide an apparatus for injecting fluids into meat cuts through a series of injection needles in such manner that drainage of liquids from the needles and manifold between injection cycles is avoided.

A still further object is to provide an apparatus as set forth and wherein automatic sequences of operation are achieved.

Still further and additional objects and advantages will be apparent to those skilled in the art as the description proceeds with reference to the accompanying drawings wherein:

FIG. 3 is a top plan view of the machine of FIGS. 1 and 2;

FIG. 4 is an enlarged fragmentary sectional view taken along the line 4—4 of FIG. 2;

Figure 1:
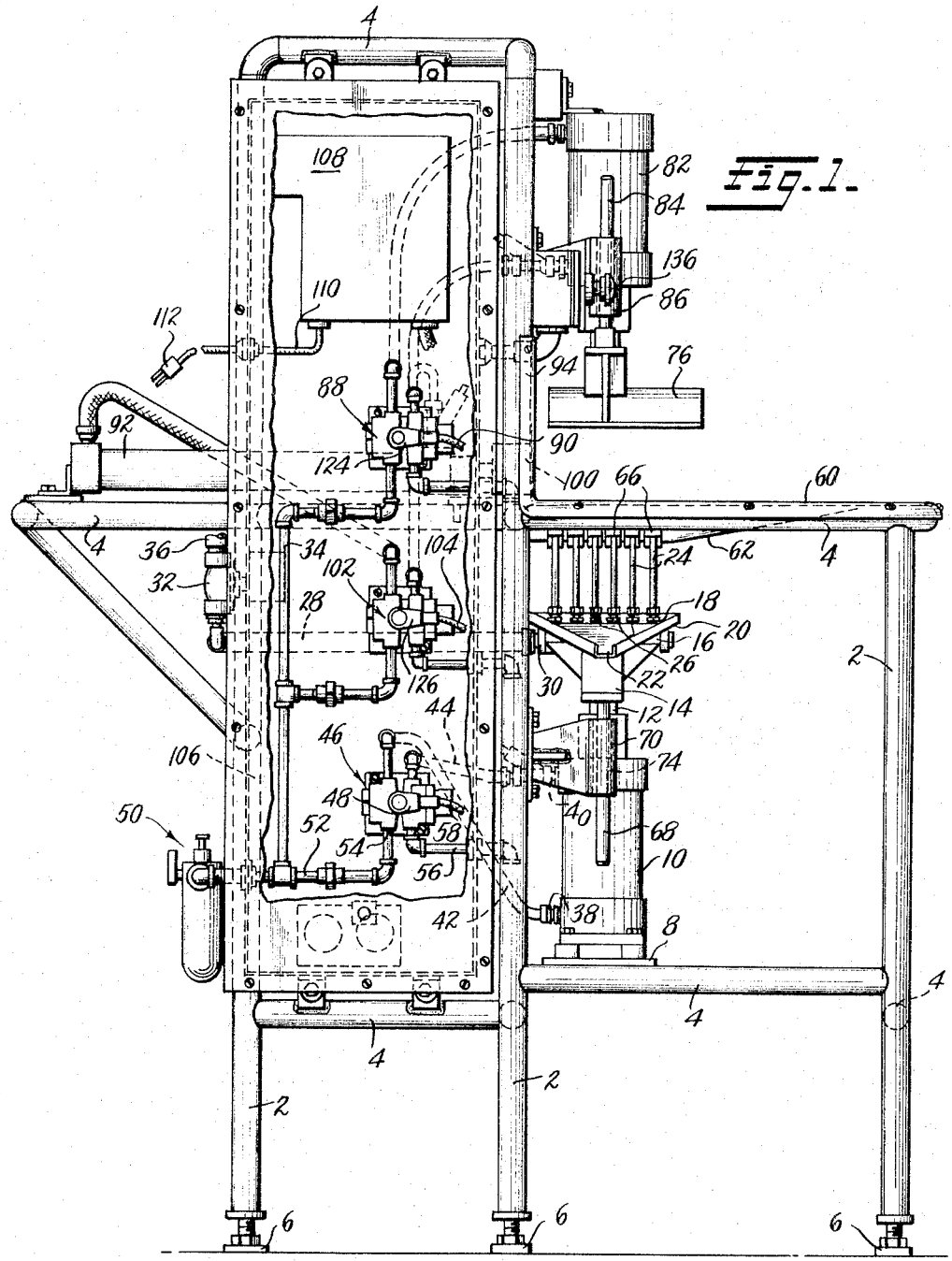
FIG. 1 is a side elevational view of an apparatus embodying this invention, parts being broken away for clarity of illustration.

The specific form of apparatus illustrated herein includes a frame structure having vertical tubular frame members 2 and horizontal tubular frame members 4 fitted and welded together in the manner illustrated. Preferably, the tubular members 2 and 4 are of stainless steel.

The vertical frame members 2 are provided with adjustable feet 6 at their lower ends whereby they can be adjusted to make firm contact with a floor and to level the apparatus. Certain of the horizontal frame members 4 support a platform 8 upon which a pneumatic double-acting piston and cylinder motor 10 is mounted. The motor 10 comprises an outer cylinder and an inner piston, not shown, including a piston rod 12 extending upwardly therefrom (see FIGS. 2 and 5). The upper end of the piston rod 12 is secured to a bracket 14 upon which a hollow manifold 16 is in turn secured. The upper surface of the manifold 16 is provided with a plate 18 having an upstanding peripheral edge 20 and a spout portion 22. Also secured in openings in the upper surface of the manifold 16 are a plurality of hollow fluid injection needles 24 mounted by means of suitable fittings 26 so that the interior of the needles are in fluid conducting communication with the interior of the hollow manifold 16. A flexible conduit 28 is connected to a fitting 30 providing communication between the conduit 28 and the interior of the hollow manifold 16. The conduit 28 is connected to a solenoid valve 32 operated by a solenoid 34 which controls the flow of pickle fluid from a suitable source of such fluid under pressure and through a conduit 36 to the manifold 16. Operation of the solenoid valve will be further described later.

The pneumatic motor 10 is provided with fluid connections 38 and 40 at its lower and upper ends, respectively, which establish communication with conduits 42 and 44 leading to a solenoid actuated 4-way control valve 46. The control valve 46 is operated by a solenoid 48 and receives air under pressure from a suitable source, indicated generally at 50. Air under pressure from the means 50 is conducted through the conduit 52 to an inlet 54 of the valve 46. The valve 46 is likewise provided with an exhaust or vent fitting 56, as shown. The valve 46 is of well-known and conventional construction and need not be further described. The solenoid 48 is energized by electric current in a cable 58, to be referred to hereinafter. Upon transmission of current through the cable 58, the solenoid operates the valve 46 to connect the inlet 54 with conduit 42 and connect conduit 42 with exhaust fitting 56. Thus, air under pressure is conducted into the lower portion of the motor 10 to force the piston upwardly. Upon stopping the current flow in the cable 58, the valve is actuated to admit air under pressure to the upper part of the motor and to exhaust the lower part, thus causing the piston to move downwardly.

Hereinafter, additional solenoid actuated 4-way valves will be referred to and it is to be understood that they may be identical to the valve thus briefly described.

Figure 5:
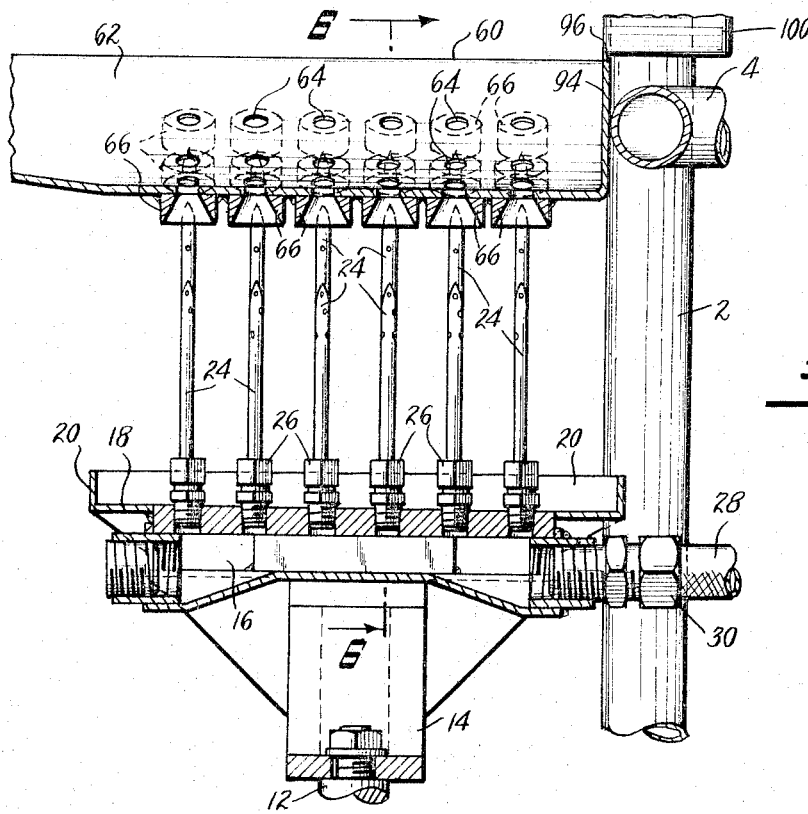
FIG. 5 is an enlarged fragmentary sectional view taken along the line 5—5 of FIG. 2.
Figure 6:
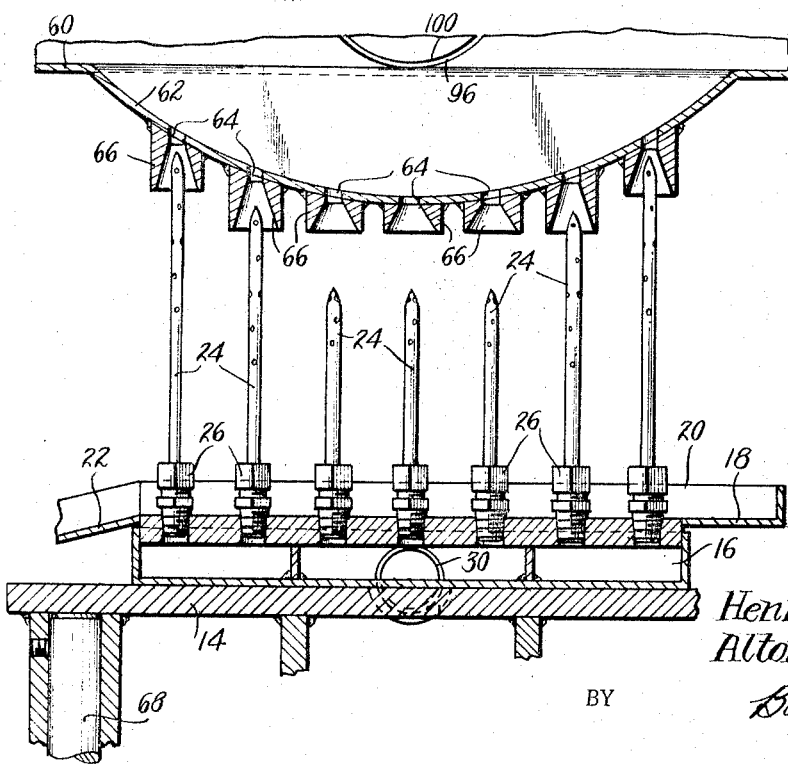
FIG. 6 is a vertical sectional view taken on the line 6—6 of FIG. 5.

Other horizontal frame members 4 support a generally horizontal table 60, as clearly shown in the drawings. The table 60 is of generally horizontal extent, but is provided with a depressed portion defining an upwardly concave seat or support 62. A shown, the concavity 62 is of a shape to conform generally to the surface of a ham, for example. As shown in FIGS. 4, 5 and 6, the concave seat 62 is provided with a multiplicity of openings 64 therein, each of which is aligned vertically with one of the needles 24 previously described so that upon upward movement of the manifold 16 and needles 24, the latter will pass through the openings 64 and penetrate any body of meat resting on the cancave seat. Preferably, the seat 62 is provided with guiding bosses 66 on its lower surface arranged to guide the tips of the needles 24 into the openings 64 in the event of slight misalignment thereof.

As is evident from FIG. 6, the needles 24 are of varying length so arranged that their upper pointed ends define a concave surface generally conforming to the concavity of the seat 62, although not exactly. It will be noted that the central needles are spaced farther from the seat 62 than are the outer ones. A satisfactory arrangement utilizes a bank of forty-two needles, as illustrated, spaced on 1 inch centers. The outer rows of needles, looking at FIG. 6, six on each side are, for example, 5 inches long with ten holes vertically and angularly spaced. The rows of needles adjacent the outer rows, twelve needles in all, are 4½ inches long and may have the same number of holes as the outer needles. The central three rows of needles are 3 inches long and have 6 holes vertically and angularly spaced. The holes begin ¼ inch from the needle tip and are spaced ½ inch apart vertically. In the example illustrated, ham will be treated and the shorter central needles will penetrate the meat in the region of the usual ham bone. Due to their shorter length they will not impinge on the bone while the other needles are progressing therepast. As illustrated in the drawings, openings 64 are provided only in the large part of the seat 62 in the region of the butt end of the ham. This is the area in which pickle deficient conditions are often encountered in arterial pumped hams. However, it is to be understood that any desired pattern of openings through other regions of the seat are also contemplated.

The arrangement of needles in an upwardly pointed direction from the manifold is important in that it avoids pickle drainage from the manifold between pumping cycles. This is important not only from the point of view of pickle loss, but because any air displacing pickle in the manifold and being pumped into the product would result in a spongy discolored area.

Figure 7:
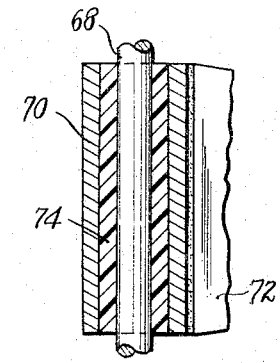
FIG. 7 is an enlarged fragmentary sectional view taken along the line 7—7 of FIG. 2.

The manifold 16 is also provided with downwardly directed guide rods 68 (see FIG. 2) slidably guided by bushings 70 mounted on the machine frame. The bushings 70 include a bracket structure 72 for attachment to the machine frame and are provided with antifriction sleeves 74 (see also FIG. 7) slidably embracing the guide rods 68. The sleeves 74 are preferably of Teflon, which has a very low coefficient of friction, needs no lubrication, and is impervious to moisture.

Substantially directly over the concave seat 62 is a clamping arrangement for securely pressing the cut of meat on the concave seat during penetration of the meat by the needles 24. The clamping means comprises a clamp member 76 having a lower surface 78 curved to define a downwardly concave surface generally conforming to the upper surface of the particular cut of meat to be held thereby. The clamp member 76 is mounted on the lower end of a piston rod 80 constituting the movable element of a double-acting pneumatic motor 82 mounted on the machine frame as shown. The clamping member 76 is likewise provided with a pair of guide rods 84 fixed thereto and extending upwardly through guide bushings 86. The bushings 86 are preferably of the same construction as those already described with reference to the guide rods 68 on the pickle manifold. The double-acting pneumatic motor 82 is controlled by a 4-way solenoid valve 88. The solenoid control valve 88 is identical in all respects to the valve 46, previously described, and is supplied with operating current through cable 90. It is likewise connected to the compressed air supply 50 and, as shown, directs pressure fluid into one end or the other of the pneumatic motor 82, depending upon the position of the valve.

A further double-acting pneumatic motor 92 is carried by horizontal frame members 4 at a level just above the concave seat 62 and below the clamping member 76. The piston rod of the motor 92 extends horizontally forwardly through a vertical plate 94 which is shown as an integral extension of the table plate 60 in which the seat 62 is formed. The vertical plate 94 is provided with an opening 96 (see FIG. 4) axially aligned with the motor 92. The piston rod 98 of the motor 92 supports a pusher head 100 which is of a size to pass through the opening 96. As shown, when the piston rod is in its retracted position, the pusher head 100 is behind the vertical wall 94 but with its front face generally flush therewith. The pusher head 100 is substantially aligned with the center line of the concave seat 62 but at a level thereabove so that actuation of the motor 92 to project the pusher head 100 forwardly will cause the head to engage a ham or other cut of meat resting on the seat 62 and push the same forwardly off the table 60 for removal from the machine. The motor 92 is controlled by a third solenoid valve 102 which may be considered to be identical to the valves 46 and 88 and which is controlled by current fed therethrough to a cable 104. The valve 102 is likewise connected to the compressed air supply in the manner shown.

The control valves 46, 88 and 102, the piping leading thereto and therefrom, and the electric cables 58, 90 and 104, are preferably housed within a compartment of the machine having an outer cover plate or wall 106. The compartment is provided with side walls, a back wall and top and bottom walls, not identified, whereby the elements housed therein are protected from moisture and pickle solution, which will have a deleterious effect on the operating mechanisms and on the electric wiring.

The piping and electric cables extending outwardly of the compartment are suitably sealed where they pass through the walls thereof.

Also within the compartment, behind wall 106, is a timer motor assembly designated generally at 108. The assembly is in itself a conventional unit and comprises an electric timing motor operable to sequentially close and open a plurality of control switches in a predetermined timed sequence whereby a desired program of operation may be achieved. The various switches, to be referred to hereafter, close circuits through the control cables 58, 90 and 104, and circuits for controlling the solenoid 34 of supply valve 32, previously described. A power cable 110 is shown extending from the unit 108 to the exterior of the compartment and provided with the usual pronged plug 112 for connection to a suitable electric outlet.

Figure 2:
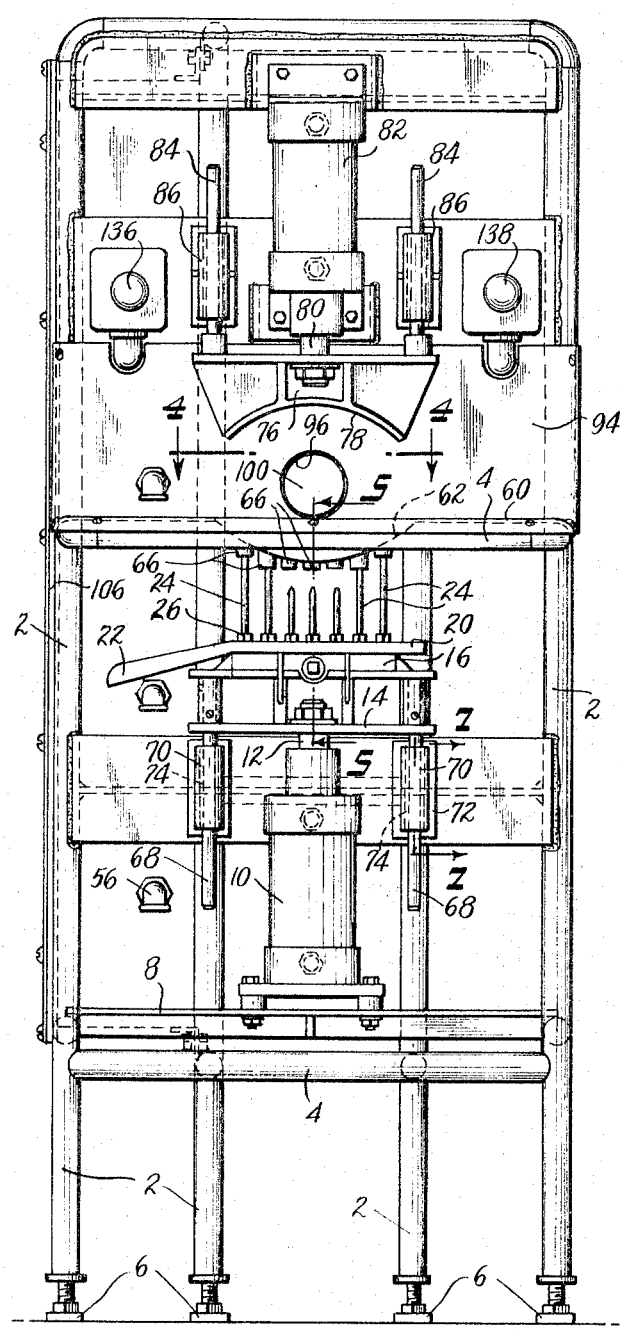
FIG. 2 is a front view of the machine shown in FIG. 1.
Figure 8:
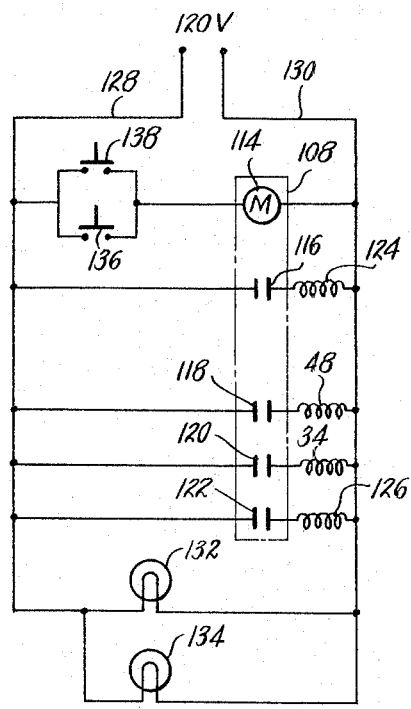
FIG. 8 is a wiring diagram showing the circuits involved in effecting automatic cyclic operation of the illustrated machine.

Referring to FIG. 8, the dotted rectangle 108 represents the timing control unit 108 of FIG. 1 and is shown as including a timing motor 114 and a plurality of switches 116, 118, 120 and 122. The switches 116 to 122 are the switches previously referred to which are sequently closed and opened by the motor 114 in a desired timed sequence. The switch 116 controls actuation of the solenoid 124 for operating the clamp control valve 88. Switch 118 controls solenoid 48 for actuating valve 46 to raise and/or lower the manifold. Switch 120 controls solenoid 34 which, in turn, operates the pickle supply valve 32. Switch 122 controls the solenoid 126 which operates valve 102 for actuating the ejector motor 92. As shown in FIG. 8, the timer control unit including the switches therein are connected across a power supply line comprising conductors 128 and 130. Also connected across the line are heating lamps 132 and 134 to avoid condensation of any moisture which may enter the unit. The timer motor 114 may be actuated by either of two starting switches 136 or 138. The switches 136 and 138 are shown in FIG. 2 as being located on the machine frame above the table 60 and on respectively opposite sides of the apparatus. Thus, an operator may start a cycle of operation from either side of the machine, depending upon which side he is standing at the time. The motor 114 in the known control mechanism is of a type which, when started by momentarily depressing either of the buttons 136 or 138, will continue to run until the switch operating mechanisms have completed one complete cycle of operation and the motor then automatically stops.

The sequence of operation of the switches 116 through 122 is preset so that the machine may be operated in the following manner:

The operator first places the desired cut of meat on the concave seat 62, the clamp member 76 being in its upper position, and the manifold 16 and needles 24 being in their lower position with the ejector 100 retracted, which are the positions assumed by those members when switches 116–122 are open. After the cut of meat (ham) is in position, one of the starting buttons 136 or 138 is depressed to initiate a cycle of operation of the timing control mechanism. Upon operation of the motor 114, the switch 116 is first closed to energize solenoid 124 which operates valve 88 to cause the motor 82 to move the clamp 76 downwardly into engagement with the meat and to apply a substantial pressure thereto. After the meat is thus clamped, the switch 118 is caused to close, thus energizing solenoid 48 and actuating valve 46 in a manner to cause motor 10 to push the manifold 16 upwardly and thus project the needles 24 through the openings 64 and into the meat being held on the seat 62. After the manifold has completed its upward stroke, switch 116 is opened by motor 114, which results in upward withdrawal of the clamp member 76 to relieve the meat of all pressure. Immediately thereafter switch 120 is closed to actuate solenoid 34 and thus open pickle supply valve 32 whereupon pickle solution under pressure is admitted through the flexible conduit 28 into manifold 16 and is thence forced upwardly through the needles 24 into the meat being treated. The switch 120 is held closed for such length of time as to inject the desired quantity of pickle solution into the meat and is then automatically opened again by the motor 114. After the switch 120 is opened and flow of pickle fluid ceases, the switch 118 is again opened by motor 114, which results in actuation of valve 46 to retract the manifold 16 and needles 24 downwardly out of the cut of meat. It is to be noted that the concave seat 62 not only serves to support the cut of meat during pickle injection, but also serves as a stripper to securely hold the cut of meat while the needles are being withdrawn therefrom. After the manifold 16 has been withdrawn downwardly to its retracted position, the motor 114 closes switch 122 to actuate solenoid 126 and thereby cause the pneumatic motor 92 to project its piston rod and pusher head 100 forwardly. During this stroke the pusher head engages the cut of meat on the seat 62 and forcibly slides the same forwardly on table 60 to a discharge position. After the forward stroke of the pusher head is completed, the motor 114 again opens switch 122 to return the pusher to its retracted position and the motor is then shut off, having completed a full cycle of operation. The operator then places another cut of meat on the seat 62, again initiates a cycle of operation in the manner described, and the entire cycle is repeated.

The function of the apparatus specifically illustrated is to inject a controlled amount of pickle solution through the bank of closely spaced needles into the pickle-deficient area of a previously treated ham. This reduces the distance between injection sites and, consequently, the time required for thorough pickle diffusion. Hams which have been pumped through the artery first and then given an additional stroke with this machine and cured one day, have about the same color as conventional hams which have been cured five to seven days. If the hams are artery pumped to a higher level to give a better dispersion and then are given a butt stroke using this machine and finally cooked to a higher internal temperature to intensify the color development, an adequate color can be obtained with a 6 hour curing time. The manner in which the machine may be used for this purpose is illustrated by the following examples.

*Example 1*

Pairs of hams were selected and the left hams pumped by conventional means. The corresponding pairs were similarly pumped except that the butt stroke was introduced through a bank of 42 needles spaced at 1 inch centers. The conventional hams were given a 5 day cure in cover pickle before smoking. The test hams were cured one day, then smoked under the same conditions as the control. Samples were taken for keeping time studies and panel acceptability ratings as shown in Table I. The color intensity and uniformity was about the same for the test as for the control.

TABLE I

|  | Test | Control |
|---|---|---|
| Keeping Time at 45° F. (days) | 16 | 16 |
| Panel Acceptability Rating: |  |  |
| Flavor | 4.6 | 4.3 |
| Texture | 4.3 | 3.9 |

Acceptability was rated on a scale from 1 to 7 with 7 being best.

*Example 2*

In a second test 30 pairs of hams were selected. The left hams were artery pumped, cured, boned and cooked by conventional means. The corresponding pairs were artery pumped about 3–4% higher then stitch pumped using the above-described machine; dipped about 1 minute in cover pickle, held 6 hrs., then boned and cooked to an internal temperature about 7° F. higher than the controls. In this way the additional pickle pumped into the ham was lost during cooking so that the final yield was about the same as is obtained by conventional procedures. Panel members were asked to choose the ham of each pair which had the best color and to rate the hams for flavor and texture acceptability on a scale from 1 to 7 with 7 being best. Table II gives the panel evaluation obtained.

TABLE II

|  | Test | Control |
|---|---|---|
| Color Preference | 81 | 78 |
| Acceptability rating: |  |  |
| Flavor | 3.4 | 3.1 |
| Texture | 3.6 | 3.1 |

*Example 3*

In a third test a pair of hams was selected. One ham was pumped through the arterial system, the other was pumped using the injector. Both hams were then immediately cooked to fix the color, and arrest further pickle diffusion. Sections were then cut from the hams at 2 inch intervals from the butt to the shank end and compared for color development. In general, those areas which were most lacking in cured color in the artery injected ham had the best color development in the machine injected ham. This shows the advantage of using the machine as an adjunct to artery pumping.

While a single specific embodiment of the invention has been shown and described herein, it is to be understood that the same is merely illustrative of the principles involved and that other forms are contemplated within the scope of the appended claims.

We claim:

1. Apparatus for injecting fluid into a cut of meat, comprising: a support formed to define an upwardly concave seating surface for supporting a cut of meat; a plurality of openings through said seating surface; a vertically movable member below said seating surface; a plurality of upwardly pointing fluid injection needles fixedly mounted on said vertically movable member, said needles being aligned with said openings; means for moving said vertically movable member upwardly to project said needles through said openings and downwardly to retract said needles below said seating surface; and selectively operable means for caussing fluid to flow through said needles.

2. Apparatus as defined in claim 1 wherein said needles are arranged to project different distances above said seat when said vertically movable member is moved upwardly whereby a meat cut is penetrated to a different depth by different needles.

3. The apparatus as defined in claim 2 wherein the centrally disposed needles are arranged to project a shorter distance above the seat than the outwardly disposed needles.

4. The apparatus of claim 2 wherein the vertically movable member comprises a manifold having a substantially horizontal upper surface and fluid injection needles of different lengths are mounted on said manifold.

5. Apparatus as defined in claim 1 including vertically movable clamp means above said seating surface for engaging and holding a cut of meat on said seating surface.

6. Apparatus as defined in claim 5 wherein said clamp means includes a downwardly concave meat engaging surface.

7. Apparatus as defined in claim 5 including an ejector member mounted for generally horizontal movement across said seating surface to engage a cut of meat thereon and eject the same laterally therefrom.

8. Apparatus for injecting fluid into a cut of meat, comprising: a perforated support for holding a cut of meat on the upper surface thereof; movable clamp means for pressing a cut of meat downwardly on said support; a plurality of upwardly pointing fluid injection needles mounted beneath said support for upward movement through the perforations thereof; fluid supply means connected to said needles for directing fluid to flow therethrough; operating means for said clamp means, fluid injection needles and fluid supply means; and cyclically operable control means for separately energizing said operating means in predetermined timed sequence wherein said clamp means first presses said meat against said support, said needles then move upwardly through said support and into said meat, said clamp means then moves to release its pressure from said meat, said fluid supply means then operates to inject fluid through said needles into said meat, and said needles then move downwardly out of said meat while said support strips said meat from said needles.

9. Apparatus as defined in claim 8 wherein said support and said clamp means are provided with opposed concave meat engaging surfaces whereby to distribute the pressure applied to said meat over a substantial surface area thereof and to hold said cut in a predetermined position of orientation.

10. Apparatus as defined in claim 8 wherein said operating means for said clamp means and said needles comprise separate fluid operated motors and a control valve for each, said operating means for said fluid supply means including a fluid control valve; a solenoid for actuating each of said control valves; said control means cyclically energizing said solenoids in the sequence described.

References Cited

UNITED STATES PATENTS

| 1,987,349 | 1/1935 | Rasmussen | 17—28 |
| 2,560,060 | 7/1951 | Zwosta | 99—256 |
| 2,741,974 | 4/1956 | Avery | 99—257 |
| 2,821,901 | 2/1958 | Abrams | 99—257 |
| 3,016,004 | 1/1962 | Harper et al. | 99—255 |
| 3,035,508 | 5/1962 | Nelson | 99—257 |
| 3,080,809 | 3/1963 | Harris et al. | 99—257 |
| 3,081,691 | 3/1963 | Schmidt | 99—257 |

FOREIGN PATENTS

| 502,486 | 7/1930 | Germany. |
| 534,355 | 10/1955 | Italy. |

BILLY J. WILHITE, *Primary Examiner.*